Dec. 6, 1949     E. J. THURBER     2,490,720
POWER TRANSMISSION
Filed Jan. 23, 1945     4 Sheets-Sheet 1

Inventor
Edward J. Thurber,
By
Attorneys

Dec. 6, 1949 E. J. THURBER 2,490,720
POWER TRANSMISSION
Filed Jan. 23, 1945 4 Sheets-Sheet 2

Inventor
Edward J. Thurber;
By Moran & Bateman
Attorneys

Dec. 6, 1949     E. J. THURBER     2,490,720
POWER TRANSMISSION Filed Jan. 23, 1945     4 Sheets-Sheet 4

Inventor
Edward J. Thurber,
By Norval L. Bateman
Attorneys

Patented Dec. 6, 1949

2,490,720

UNITED STATES PATENT OFFICE 2,490,720

POWER TRANSMISSION

Edward J. Thurber, New Orleans, La.

Application January 23, 1945, Serial No. 574,096

22 Claims. (Cl. 74—774)

1

The present invention relates to improvements in power transmissions adapted to be used for starting and controlling the operation of machines or mechanisms of various kinds, including automobiles and motor boats, and for varying the torque and ratio of speed transmitted from a driving to a driven element.

One of the primary objects of the invention is to provide a novel and improved power transmission which is relatively simple in construction, and is capable of transmitting power from a driving element to a driven element through a range of speed which may be varied infinitely from zero or neutral up to the maximum speed for which the transmission is designed.

Another object is to provide a power transmission of novel construction whereby it may be set in neutral position for non-transmission of power, or set to transmit power at infinitely varying speeds, or set for transmission of power in a reverse direction, all under control of a single control member.

Another object is to provide a power transmission for automobiles, motor boats and other vehicles in which it is adapted to serve as a combined clutch and variable speed forward and reverse transmission.

Another object is to provide a power transmission embodying a rotor carrying hydraulic torque transmitting means, and which is rotatable in either forward or reverse direction for transmission of motion in one or the other direction.

Another object is to provide a power transmission embodying a rotor carrying hydraulic torque transmitting means, and which enables motion through one range of speed to be obtained from one side thereof, and motion at another range of speed to be obtained from the other side thereof.

Another object is to provide a power transmission embodying a rotor carrying hydraulic torque transmitting means, and which is adapted to occupy a neutral position, and is movable in one or the other direction from such neutral position to transmit motion in forward or reverse direction.

A further object of the invention is to provide a novel hydraulic transmission which is capable of transmitting torque and speed variably through a range from zero up to the speed of the driving element, and which provides a free-wheeling action between the driving and driven elements, and embodies means controllable at will to lock out the free-wheeling action and provide a mechanical connection between the driving and driven elements.

To these and other ends, the invention consists in certain improvements and combinations and arrangements of parts, all as will be hereinafter described in detail, the features of novelty being pointed out more particularly in the claims at the end of this specification.

In the accompanying drawings.

Similar parts are designated by the same reference characters in the several views.

In the embodiments of the invention shown in the present instance, 1 and 2 designate a pair of axially alined shafts, 1 designating the driving shaft connected to any suitable source of power, and 2 designating the driven shaft connected to the element or mechanism to be driven, these shafts being suitably supported for rotation, as by bearings 3 and 4 in a relatively stationary mounting 5, the latter preferably providing a closed chamber 6 within which the operative mechanism is enclosed. The shaft 1 has a head 7 formed on or fixed to its inner end which extends into said chamber, said head being provided with internal axially extending splines 8 along which a correspondingly splined frictional synchronizing member 9 is slidable, this member being pressed inwardly by a pre-loaded spring 10 and retained within the head by a split ring 11 through which splines 57 will pass, the ring 11 being removably inserted into a groove extending around the interior of the head adjacent to its inner end, the member 9 being normally pressed yieldingly against said ring under the action of the spring 10.

An intermediate shaft 12 is interposed between and alined axially with the shafts 1 and 2 and is slidable axially thereof, one end of the shaft 12 having splines 12a which slidably connect it to the shaft 2, and the other end of the shaft 12 having a portion 12b of reduced diameter which extends into the head 7, and is centered and rotatably supported therein by a pilot bearing 13 which is preferably a roller or other antifriction bearing the outer race of which is pressed or otherwise secured immovably in a recess 14 in the member 9 and the reduced end 12b of the shaft 12 being slidable in the inner race of this bearing. The head 7 is formed as a part of or otherwise fixed to a circular casing 15 at one side thereof, this chamber being concentric with the shafts 1, 2 and 12, and the other side of this casing is provided with a hub 16 which is rotatably centered or mounted on the shaft 12, said hub as shown in the present instance having an annular flange 17 extending inwardly therefrom and bearing rotatably on a sleeve 18 which is mounted loosely or rotatably on the shaft 12 and carries or is rigidly connected to a head 19 which is coaxial with the head 7, and is provided with internal coaxially extending splines 20. A correspondingly splined frictional synchronizing member 21 is slidable axially within the head 19 and is pressed inwardly by a pre-loaded spring 22, it being retained within said head by a split ring 23 through which splines 58 will pass, the ring 23 being removably inserted into a groove extending around the interior of the head adjacent to its inner end. A bearing 24 is preferably provided between the sleeve 18 and the mounting 5 to support said sleeve and to afford additional support for the shaft 12.

The hub 16 on the casing 15 has a spur gear 25 formed on or otherwise fixed thereto, this gear meshing with a suitable number of pinions 26 the shafts 27 of which are fixed, as by pins 28, to the stationary mounting 5, and these pinions mesh with an internal gear 29 which is fixed, as by a key or splines 30 to the sleeve 18 to rotate therewith. This gearing is preferably housed in a chamber 31 which is formed as a part of the mounting 5 but separated from the chamber 6 therein, and provided with a filler plug 32 through which an appropriate lubricant may be supplied. The head 19 is connected to the casing 15 through the gears 25 and 29 and pinions 26 whereas the head 7 is connected to said casing directly.

Figure 1:
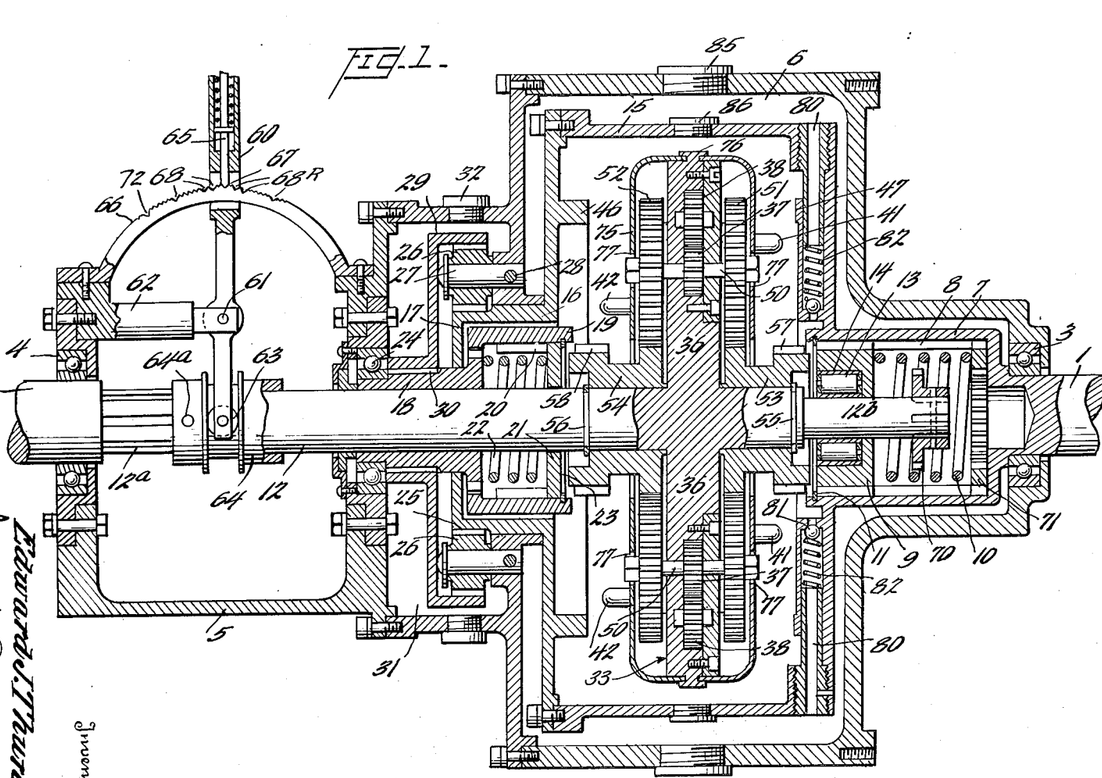
Figure 1 is a section taken axially through a power transmission embodying the present invention.

The shaft 12 carries a rotor 33 and associated means for the transmission of torque between the driving and driven shafts 1 and 2 hydraulically under control of a single controlling member whereby the shaft 2 may be driven from the shaft 1 in either forward or reverse direction, and through a range of speed which is variable infinitely between zero and the speed at which the driving shaft 1 is rotated. The rotor according to the present invention is rotatable and shiftable axially with the shaft 12, it comprising in the present instance a ring 35 which is concentric with the shaft 12 and is provided with a suitable number of radial webs or arms 36, four being shown in the present instance. In the embodiment shown in Figs. 1 and 2, each of these webs or arms carries a gear pump which comprises a pair of meshing gears 37 and 38 housed in the respective web in the manner of an ordinary gear pump and having passages 39 and 40 for the flow of oil or other liquid therethrough. In the embodiment shown in Figs. 1, 2 and 3, these liquid flow passages are controlled by valves 41 and 42 which are in the form of plungers reciprocable in valve chambers 43 and 44 extending transversely of the respective passages, the valves being movable partially or completely across the respective passages to restrict or completely prevent the flow of liquid therethrough, but being normally and yieldingly held in retracted position to permit unrestricted flow of liquid through said passages by compressed coil springs 45 and 46 respectively. The ends of the liquid flow passages beyond the valves communicate with the respective spaces 45a between the arms of the rotor. The stem of one of the pair of valves for each pump projects from one side of the rotor opposite to a circular track 46, and the other of each of these pairs of valves projects from the other side of the rotor opposite to a circular track 47. These tracks are located on the opposite inner walls of the casing 15, and the valves are spaced from both of these tracks while the rotor is in its neutral position or midway between the tracks, as shown in Fig. 1, all of the valves being then fully open.

The gear 37 of each pump has its shaft 50 extended through the sides of the rotor and has drive gears 51 and 52 fixed to its respective ends for driving the respective pump, these gears meshing with pump drive gears 53 and 54 respectively which are mounted rotatably on the shaft 12 at opposite sides of the rotor, and being restrained from axial displacement on said shaft by split retaining rings 55 and 56 which are removably inserted in grooves in said shaft. The gears 53 and 54 thus confined between the respective sides of the rotor and the retaining rings are rotatable freely on the shaft 12 but are constrained to shift axially with said shaft when such movement is imparted thereto. The gear 53 is provided with splines 57 which are movable through the ring 11 and engageable with the splines 8 in the head 7 when the shaft 12 and the rotor thereon are shifted axially in one direction, and the gear 54 is provided with splines 58 which are movable through the ring 23 and engageable with the splines 20 in the head 19 when said shaft and the rotor are shifted axially in the opposite direction, whereby a positive or mechanical driving coupling is effected between one or the other of these gears and the respective head. The end faces of the gears 53 and 54 and the adjacent faces of the members 9 and 21 which oppose them provide friction surfaces which are relatively separated while the rotor occupies its neutral position, as shown in Fig. 1, but when the rotor is shifted axially in a direction toward one or the other side thereof, the friction surface of the gear 53 or 54 on that side will be brought into engagement with the friction face of the respective synchronizing member 9 or 21 opposing it before the splines on said gear mesh with the splines in the respective head, and as the shifting movement of the rotor continues, such synchronizing member will be pressed by its spring against the approaching gear, the frictional drag thus produced bringing the gear and the respective head to the same speed, or substantially so, and thereby facilitating the meshing of the splines on the gear with those in the head.

Axial shifting of the shaft 12 and the rotor thereon may be effected by any suitable means, such means comprising in the present instance, a hand lever 60 which is pivotally mounted between its ends on a pin 61 supported by an arm 62 which may be bolted or otherwise fixed to the mounting 5, one end of this lever carrying a fork or roller 63 riding in the groove of a collar 64 fixed to the shaft 12 as by a pin 64a. The other end of this lever provides a handle for its manual operation, and carries means for retaining it in different operative positions in which it may be set, the retaining means preferably comprising a spring-pressed pawl 65 which cooperates with a sector 66 bolted or otherwise fixed to the mounting 5. The sector is provided with appropriately located notches with which the pawl cooperates to retain the rotor in its different axial positions, the sector having a notch 67 in which the pawl engages when the rotor is in its neutral position, as shown in Fig. 1, and a suitable number of notches 68 at one side thereof in which the pawl engages when the lever is swung to the left into a position to mesh the splines on the gear 53 with those in the head 7, and a suitable number of notches 68R at the other side of the notch 7 in which the pawl engages when the lever is swung to the right into a position to mesh the splines on the gear 54 with those in the head 19, and to bring the valves at one or the other side of the rotor into contact with the respective track and to operate the valves to different extents to produce different speeds of the driven shaft. The sector-engaging end of the pawl and the notches in the sector are preferably bevelled so that although the pawl will retain the lever in the different positions in which it may be set, the pawl will yield against its spring and thus permit movement of the lever when a sufficient force is applied manually to change the setting of the lever.

Means is provided for coupling or clutching the shaft 1 directly to the shaft 12 whereby a mechanical connection is made between the shafts 1 and 2 when such is desired. Such means, as shown in the present instance, comprises a clutch 70 which is suitably fixed to the reduced end 12b of the shaft 12, as by the splines and pin shown, and a cooperative internally and externally splined member 71, the external splines on this member meshing with the internal splines 8 in the head 7 so that said member will always rotate with the shaft 1, and the internal splines of said member being adapted to receive and mesh with the splines on the clutch 70. The clutch 70 is located in such a position axially of the shaft 12 that it will be normally disengaged from the member 71 but will be brought into engagement with said member after the rotor has been shifted to the right in Fig. 1 beyond the point where the valves are fully closed. The sector 66 may be provided with an additional notch 72 to receive the pawl 65 and thereby retain the clutch 70 in coupled relation with the member 71.

The sides of the rotor are substantially enclosed by a casing which is composed preferably of a pair of complemental circular dished sections 75 which are fitted to the respective sides of the rotor, the peripheral edges of the casing sections being suitably secured in circular grooves 76 which extend around the periphery of the rotor and thereby provide joints between it and the casing sections. This casing thus provides a chamber which encloses the rotor and its cooperating elements thereby minimizes friction between these parts and the body of oil or liquid which is contained in the casing 15. Suitably located holes 77 are provided in the casing sections to admit oil or liquid to the rotor chamber from the surrounding casing 15 which serves as a reservoir.

Means is provided for venting air from the casing 15 to thereby avoid development of pressure therein due to expansion of the oil or other liquid or air due to heating, or other causes. Such venting means, as shown in the present instance, comprises a suitable number of passages 80 which lead from the central portion to the periphery of the casing 15. The outer ends of these passages are open, but their inner ends are controlled by check valves 81 which are yieldingly pressed inwardly onto their seats by compressed springs 82. The check valves 81 serve to seal the casing 15 against the escape of oil or liquid therefrom while this casing is not rotating, and the springs 82 are loaded sufficiently to hold the vent valves on their seats until the casing revolves at a sufficiently high speed to throw the liquid outwardly to the periphery of the casing, after which the centrifugal force acting on the valves will be sufficient to open them and thereby vent any air accumulated in the casing under pressure. Filler plugs 85 and 86 are provided in the peripheries of the chamber 6 and casing 15 through which the operating liquid, preferably oil, may be supplied in a quantity sufficient to submerge the inlets of the pumps while the rotor is rotating, and the oil may be removed through these plug openings, if necessary.

Figure 2:
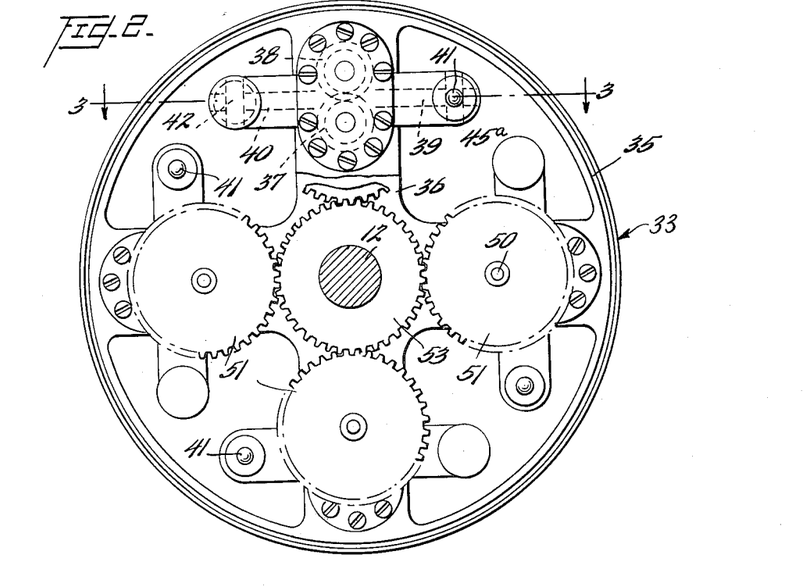
Figure 2 is an elevation of the rotor of the transmission as viewed from the right in Fig. 1.
Figure 3:
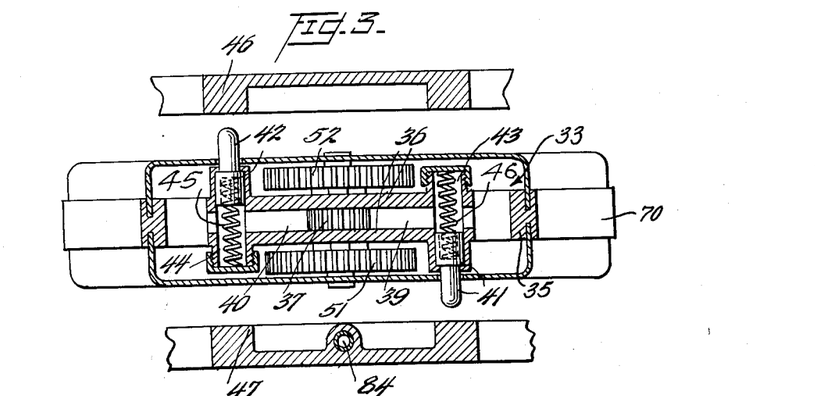
Figure 3 is a detail section taken on the line 3—3 in Fig. 2.

The operation of the transmission shown in Figs. 1, 2 and 3 is as follows: Assuming the casing 15 has been supplied with oil or other suitable liquid in an amount sufficient to continuously supply the pumps therewith during operation of the transmission, that the shaft 1 is being rotated by an engine or other source of power, and that the rotor 33 occupies its central or neutral position shown in Fig. 1, the rotor will then be uncoupled from the driving and driven shafts 1 and 2, the pumps will be idle, and the valves will be in fully open position as shown in Fig. 3, and no motion will be transmitted to the shaft 2, but the oil in the casing 15 will be thrown to the periphery thereof and the pumps will be submerged in this annular body of oil.

If it is desired to drive the shaft 2 in a forward direction or in the same direction as that of the driving shaft 1, the lever 60 is swung toward the left in Fig. 1, thereby sliding the shaft 12, and the rotor 33 thereon toward the right from the neutral position shown in that figure. The first part of such axial movement of the shaft 12 and rotor will bring the friction surface on the gear 53 into engagement with the friction surface on the member 9 and as such axial movement continues, the member 9 will be pressed back against the spring 10, the result of which is to apply a frictional drag between the member 9 and the gear 53 which will set the latter into rotation and synchronize it with the rotating member 9, thereby facilitating the meshing of the splines 57 on said gear with the splines 8 in the rotating head 7.

Meshing of the splines on the gear 53 with those in the head 7 couples or forms a driving connection between the shaft 1 and said gear, and rotation of said shaft is transmitted through the gears 53 and 51 to the pumps, causing them to operate to circulate oil or liquid therethrough, it being understood that the inlet and discharge passages of the pumps will be submerged in the annular body of the oil which is thrown centrifugally against the inner periphery of the casing 15 by the rotation thereof. The pump valves during this stage of the operation, will be fully open, due to the lost motion provided by the spaces between the stems of the valves and the track 47 through which the valve stems travel before engaging said track.

Further axial movement of the shaft 12 and rotor thereon toward the right in Fig. 1, after the gear 53 had been coupled or clutched with the rotating head 7, brings the stems of the valves 41 in the passages 39, which are then the discharge passages of the pumps, into contact with the track 47, and as such movement continues, these valves are pressed inwardly against their springs 43 and extend more or less across the respective passages 39, depending on the extent to which the lever 60 is operated from its central or neutral position, these valves thereby restricting correspondingly the discharge of oil or liquid from the pumps. Such restriction of discharge of oil from the pumps builds up pressure in the discharge passages of the pumps and thereby resists their operation, so that torque is applied by the gear 53 to the pump driving gears 51, and such torque is transmitted to the rotor and thereby rotates it in the same direction in which the shaft 1 and gear 53 are rotating. The magnitude of the torque thus transmitted, and the speed at which the rotor and shaft 12 are thereby rotated are controlled by the extent to which the lever 60 is operated relatively to the notches 68 in the sector, it being apparent that such torque and speed will be zero, or substantially so, while the rotor is in its central or neutral position and before the pump discharge valves engage the track, at which times the discharge valves will be fully open, and that after these valves have engaged the track, the torque and speed transmitted to the rotor will increase by infinite variations as the discharge valves are pressed toward closed positions until these valves are fully closed, discharge of oil from the pumps being then blocked completely, thus obstructing operation of the pumps, and the shafts 50 and gears 51 of the pumps then act as driving connections between the rotor and the gear 53 which drive the rotor and its shaft 12, and also the driven shaft 2 at the same speed as that of the driving shaft 1. The torque and speed transmitted to the driven shaft may be reduced by infinite variations by returning the lever 60 to its neutral position.

When the transmission is applied to an automobile, it thus provides an infinite variation of speed from zero or neutral up to direct or high speed, all under control of the single lever or controlling member 60. When used on an automobile, the transmission also provides automatically a free-wheeling action between the automobile engine driving the shaft 1 and the shaft 2 which drives the automobile wheels when the engine throttle is partially or fully closed and the driven shaft 2 rotates at a higher speed than that of the engine driven shaft 1, and while the valves 41 are closed. Under such conditions a reverse torque is applied by the gear 53 to the pump operating gears 51 which tends to rotate the pumps in a reverse direction, the pump discharge passages 39 then becoming the pump inlet passages, and the valves 41 becoming the pump inlet valves, and if said valves are closed, no oil or liquid can enter the pumps so that they will operate idly or without developing any appreciable pressure on the oil or liquid, any partial vacuum developed at the pump inlets being negligible, and the valves 42 in the passages 40, which then become the pump discharges, being open. If it is desired to prevent such free-wheeling action, it may be locked out by moving the lever 60 beyond the notches 68 to the notch 72 whereby the clutch 70 on the shaft 12 is engaged with the member 71 and forms a direct mechanical coupling between said shaft and the shaft 1, thereby transmitting the reverse torque from the shaft 2, through the shaft 12, to the shaft 1. Also while the clutch 70 is engaged with the member 71, a direct drive is provided from the shaft 1 through the shaft 12 to the shaft 2.

Reverse drive of the shaft 2 from the shaft 1 is obtained by swinging the lever 60 to the right in Fig. 1, thereby sliding the shaft 12 and the rotor thereon toward the left from the neutral position shown in that figure. The first part of this operation will bring the gear 54 into frictional contact with the member 21 splined in the head 19, and as such operation is continued, the spring 22 will act to press said gear and head together frictionally, thereby producing a drag on the gear 54 to synchronize it with the member 21 and thereby facilitate meshing of the splines on said gear with the splines 20 in the head 19. This head, however, is driven from the shaft 1 in a relatively reverse direction and at a relatively lower speed through the gear 29 which is fixed thereto, and the gear 25 fixed to the casing 15, and the interposed pinions 26.

After the head 19 and gear 54 have been coupled or clutched together, continued movement of the control handle toward the notches 68R of the sector will shift the rotor and shaft 12 further toward the left in Fig. 1, thereby causing the gear 54 meshing with the gears 52 to drive the pumps in a direction which is the reverse and at a speed less than when the pumps are driven by the gear 53, and to bring the stems of the valves 42 into contact with the track 46. While the pumps are being thus driven in reverse direction, the fluid passages 39 are the pump inlets and the passages 40 the pump discharge passages, and the valves 42 are the pump discharge valves, and as the rotor is shifted toward the left in Fig. 1, the valves 42 are pressed toward closed position, thus restricting the discharge of the oil or liquid from the pumps and thereby resisting increasingly operation of the pumps, with the result that the gear 54 carries around with it the pump shafts 50 and gears 52 and thereby drives the rotor in a reverse direction and at a speed which varies according to the extent of closing of the pump discharge valves 42 by the shifting of the rotor leftward in Fig. 1. Reverse driving of the shaft 2 may thus be effected at a speed which varies infinitely from zero or neutral up to the maximum speed for which the reverse gearing is designed. During reverse operation, the rotor rotates in an opposite direction to that of the casing 15, but resistance offered by the oil or liquid contained in said casing is minimized by the smooth casing sections 75 which are streamlined and cover the gears and other parts of the rotor.

Another form of rotor and valves is shown in Figs. 4 to 8 inclusive, which may be used in the structure shown in Fig. 1 in place of the rotor shown in that figure. In this other form of rotor, the shaft 12' corresponds with the shaft 12, the gears 53' and 54' to the gears 53 and 54 and are adapted to cooperate with the heads 7 and 19 and synchronizing members 9 and 21 respectively, and the pump gears 37' and 38', pump shafts 50' and pump driving gears 51' and 52' correspond with the similarly designated parts in Fig. 1, and the rotor is adapted to operate within the reservoir chamber in the casing 15 in that figure. However, in Figs. 7 and 8 only two gear pumps are employed, which are housed in the opposite radial arms 36' of the rotor, and the casing sections 75' are closed at their outer portions to retain the oil or operating liquid therein, the outer peripheral edges of these casing sections being sealed against the escape of oil or liquid therefrom by a surrounding sealing ring 76', the interior of the rotor casing communicating with the surrounding casing 15 only through the space in the center of the rotor casing through which the gears 53' and 54' extend.

Figures 4, 5, 6:
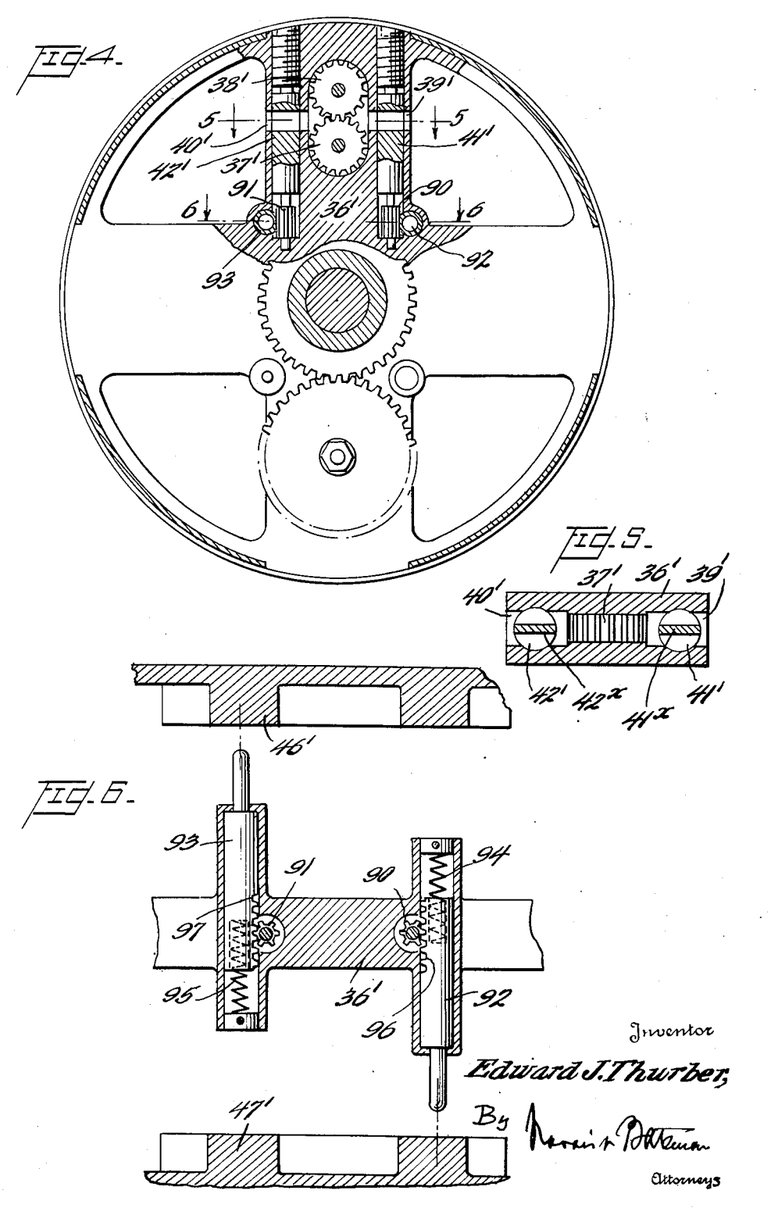
Figure 4 is a view of the rotor similar to Fig. 2, but showing a modification of the controlling valves.
Figures 5 and 6 are detail sections taken on the lines 5—5 and 6—6 respectively in Fig. 4.

The valves 41' and 42' which control the discharge and inlet passages respectively of each pump are mounted rotatably in the respective arm, and they have gates 41x and 42x which are rotatable in the respective passages 39' and 40' and thereby control the flow of oil or liquid therein. The valves extend inwardly in the respective arms 36' and are formed or provided with gear teeth 90 and 91, and plungers 92 and 93 are mounted to reciprocate transversely in the arm 36' and have stems which project repectively from the opposite sides of the rotor and are yieldingly pressed outwardly by preloaded springs 94 and 95 respectively. These plungers are provided with racks 96 and 97 which cooperate with the gear teeth 90 and 91 on the respective valves whereby reciprocation of one or the other plunger will rotate the respecting valve. While the valve operating plungers are in their normal extended positions, as shown in Fig. 6, the valves will be fully open as shown in Fig. 5 and will not restrict or close the pump passages 39' and 40', but when one or the other of these plungers is pressed inwardly against its spring, the respective valve will be rotated toward closed position, thereby restricting the flow of oil or liquid through the respective pump passage, and if either plunger is pressed inwardly to a sufficient extent, the respective valve will be closed completely, thereby blocking the flow of oil or liquid through the respective pump passage. The plungers 92 and 93 are operated by shifting the rotor axially to bring the plungers projecting from one or the other side of the rotor into contact with one or the other of tracks 46' and 47', which like the tracks 46 and 47 are on the opposite inner walls of the casing 15 although located closer to the center of the rotor to conform with the locations of the plungers. Except for the difference in the type of valve employed, and the plungers for actuating them, the operation of the structure shown in Figs. 4 to 8 inclusive is similar to that of the apparatus shown in Figs. 1 to 3 inclusive.

Figure 7:
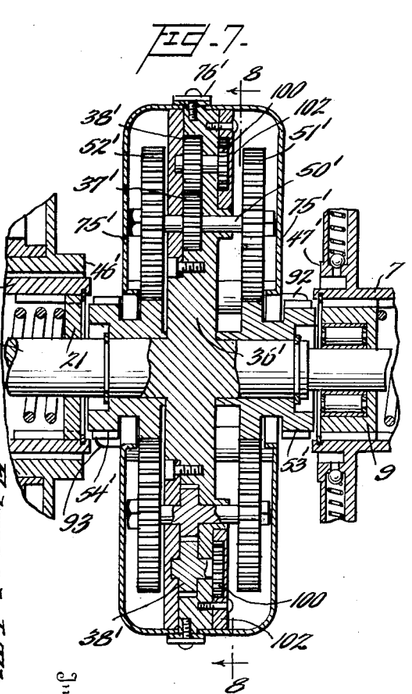
Figure 7 is a section through a portion of the transmission, showing a rotor of modified construction embodying scavenging pumps.
Figure 8:
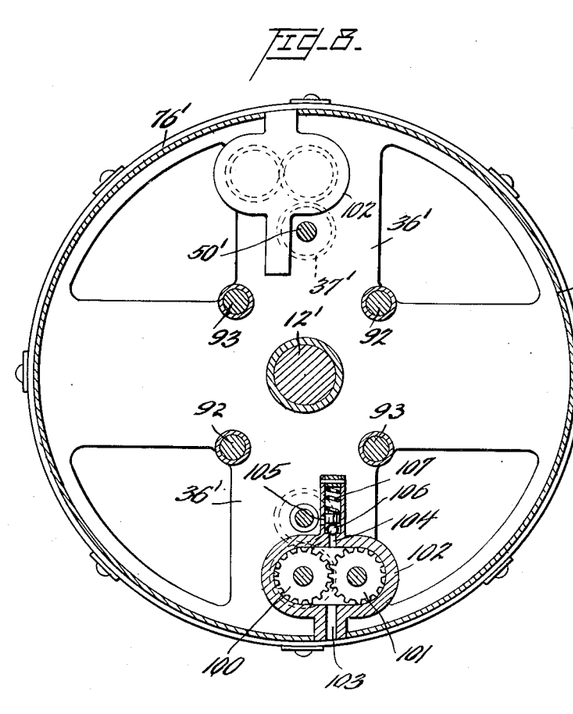
Figure 8 is a section through the rotor, taken on the line 8—8 in Fig. 7.

The rotor shown in Figs. 7 and 8 further enables the casing of the rotor to be employed as a container for the oil or liquid circulated through the pumps, and provides means for supplying to and maintaining the oil or liquid in the rotor casing 75'. As previously stated, the rotor casing is closed except at the center where it is provided with openings to accommodate the gears 53' and 54', so that oil or liquid introduced into this casing will remain therein, it being thrown by centrifugal force against the inner side of the periphery of the casing during its rotation.

One of or preferably both of the torque transmitting pumps is provided with a scavenging pump which is preferably of the gear type comprising a pair of pump gears 100 and 101 housed in a pump casing 102 which may be bolted or otherwise secured to the adjacent side of the respective rotor arm 36', the pump gear 100 being mounted on or driven preferably by the shaft of the respective pump gear 37', as shown. The casing 102 is provided with an inlet passage 103 which leads inwardly thereto from the periphery of the rotor casing, and said casing is provided with a discharge passage 104 which communicates through a port 105 with the interior of the rotor casing. The pump gears 100 and 101 are driven in a direction to draw in oil or liquid through the inlet passage 103 from the surrounding casing 15 while the oil circulating pumps 37', 38' are driven in one direction, preferably the direction to drive the rotor in the forward direction, and in order to prevent the scavenging pump from withdrawing oil or liquid from the rotor casing while the oil circulating pumps 37', 38' are driving the rotor in the reverse direction, a check valve 106 is provided in the discharge passage of the scavenging pump, this valve being preferably pressed yieldingly toward its seat by a pre-loaded spring 107. This valve will be opened automatically by the pressure of oil or liquid from the scavenging pump as the latter is driven in one direction, thereby pumping oil or liquid from the surrounding casing 15 into the rotor casing to keep it filled and avoid any drag on the rotor casing, while in neutral, but prevents draining of oil or liquid from the rotor casing by the scavenging pump while the latter is being driven in the reverse direction.

Although in the foregoing description, the shaft 1 has been regarded as the driving shaft, so that in the embodiments shown a variation of speed of the shaft 2 from zero up to the speed at which the shaft 1 is rotating can be obtained, and a reverse drive of the shaft 2 at a speed lower than that of the shaft 1 is provided, it will be apparent that the transmission may be driven by the shaft 2, in which event the shaft 1 would be the driven shaft. In driving the shaft 1 from the shaft 2, the gears 25 and 29 and interposed pinions 26, while in operation, will drive the shaft 1 in reverse direction at a higher speed than that of the shaft 2, which may be employed advantageously in certain types of machines, for example, in which is relatively slow advance and quick return of the tool or work or other element is desired.

The improved power transmission provided by the present invention enables torque to be transmitted from a driving to a driven element at infinitely varying speed from zero or neutral up to the speed of the driving element or other maximum for which the mechanism is designed, and to enable reverse drive of the driven element to be obtained, under the convenient control of a single control element.

The improved transmission is particularly suitable for use on automobiles and other automotive vehicles for controlling the starting and the transmission of torque between the engine and the driving wheels. When so used, it functions as a clutch whereby the engine may be connected to and disconnected from the vehicle driving wheels, and also as a reversible variable speed transmission whereby the magnitude of the torque transmitted to propel the vehicle, and the speed at which it may be driven, may be varied infinitely throughout the range from neutral up to maximum, and it provides for a reverse drive for the vehicle.

Since all of the operations of the transmission are controlled by a single lever or other control element, such control may be exercised with greater facility than is possible with automobile transmissions of the usual or conventional type.

It will be understood that the control lever may be operated either manually, or by any other desired means.

The present invention provides a simple and efficient construction for the transmission of motion in either forward or reverse direction. The rotor is rotatable in one direction for the transmission of motion in one direction, and is rotatable in the opposite direction for the transmission of motion in the relatively opposite or reverse direction. Furthermore, motion through one range of speed is obtained from one side of the rotor, and motion through another range of speed is obtained from the other side of the rotor.

I claim as my invention:

1. A power transmission comprising driving and driven elements, driving members connected to one of said elements for rotation at different relative speeds, and a rotor carrying as a unit therewith hydraulic torque transmitting means connectable with one or the other of said driving members for operation thereby by movement of said rotor and hydraulic means as a unit into one or another position, and said rotor being movable into an intermediate neutral position.

2. A power transmission according to claim 1, including means for driving said driving members in relatively opposite directions.

3. A power transmission comprising driving and driven elements, reverse gearing connected to one of said elements, hydraulic variable torque transmitting means, and means connected to the other of said elements including a single control member for connecting the torque transmitting means to one of said elements or to the reverse gearing and for controlling the transmission of torque between said elements through said hydraulic means either directly or through the reverse gearing and the magnitude of torque transmitted by said hydraulic means.

4. A power transmission comprising driving and driven elements, members connected to said elements to rotate in relatively reverse directions, and a rotary hydraulic torque transmitting unit connected to one of said elements and carrying torque transmitting elements connectable respectively with one or the other of said members by movement of the hydraulic unit axially in one or the other direction.

5. A power transmission comprising driving and driven elements, hydraulic torque transmitting means connected to one of said elements and having means for varying the magnitude of torque transmitted thereby, means for establishing an operating connection between said hydraulic means and the other of said elements by movement of said hydraulic means relatively to said other element, and means controlled by said movement of said hydraulic means for controlling said torque varying means.

6. A power transmission comprising driving and driven elements, a rotor connected to one of said elements and movable relatively to the other of said elements, and carrying hydraulic torque transmitting means and means for controlling the magnitude of torque transmitted thereby, and means operable by said movement of the rotor to establish an operating connection between said other element and said torque transmitting means and to actuate said controlling means.

7. A power transmission comprising rotatable driving and driven elements, a rotor connected to one of said elements and movable axially toward and from the other of said elements, hydraulic torque transmitting means carried by the rotor and having means for connecting it to and disconnecting it from said other element by said axial movement of the rotor, and controlling means for said torque transmitting means controlled by said axial movement of the rotor.

8. A power transmission comprising rotatable driving and driven elements, a rotor connected to one of said elements and movable axially toward and from the other of said elements, hydraulic torque transmitting means carried by the rotor, a coupling member engageable with said other element by said axial movement of the rotor to establish a driving connection between said other element and said hydraulic means, and valve means controlling said hydraulic means and controlled by said axial movement of the rotor.

9. A power transmission according to claim 8, including means cooperative with said coupling member for synchronizing it with said other element.

10. A power transmission comprising rotatable driving and driven elements, a rotor connected to one of said elements to rotate therewith and movable axially of the other of said elements, a pump carried by the rotor, valve means controlling the pump and controlled by said axial movement of the rotor, and a pump driving member engageable with said other element by said axial movement of the rotor.

11. A power transmission comprising coaxial driving and driven shafts, a rotor connected to one of said shafts to rotate therewith, a pair of coupling members at opposite sides of the rotor and connected to the other of said shafts, reverse gearing interposed between said other shaft and one of said coupling members, pumps carried by the rotor and having controlling valves, and means at opposite sides of the rotor and engageable with the respective coupling members for driving said pumps, the rotor being movable axially relatively to said shafts to control said pump driving means and valves.

12. A power transmission comprising a rotatable casing, a rotor mounted coaxially therein and movable axially thereof, pumps carried by the rotor, valves controlling the inlets and discharges of the pumps and having operating means arranged respectively at opposite sides of the rotor, pump gears arranged at opposite sides of the rotor, coupling members at opposite sides of said casing and engageable by the respective pump gears by axial movement of the rotor in one or the other direction, and means at opposite sides of said casing and engageable respectively by said valve operating means by axial movement of the rotor in one or the other direction.

13. A power transmission comprising a rotatable casing, driving heads in the opposite sides thereof, one of said heads being connected to the casing to rotate therewith, reverse gearing connecting the other of said heads to said casing, a rotor rotatable in either direction in said casing and movable axially therein, pumps carried by the rotor and having valves controlling their inlets and discharges, gears connected to the pumps and mounted centrally at opposite sides of the rotor to cooperate with the respective driving heads when the rotor is moved axially in one or the other direction, and means between said casing and the rotor for operating said valves when the rotor is moved axially in one or the other direction.

14. A power transmission according to claim 13, including means associated with said heads and gears for synchronizing them.

15. A power transmission according to claim 13, wherein said casing provides a reservoir for liquid for said pumps, and including vents leading from said casing, and spring-loaded check valves normally closing said vents and adapted to be opened by centrifugal force developed by rotation of said casing.

16. A power transmission according to claim 13, wherein said casing provides a reservoir for liquid for said pumps, and including an enclosure for said rotor and pumps to contain liquid for said pumps, and means for pumping liquid from said casing into said rotor enclosure.

17. A power transmission according to claim 13, wherein said casing provides a reservoir for liquid for said pumps, and including an enclosure for said rotor, a pump operative by rotation of the rotor in one direction to transfer liquid from said casing to said rotor enclosure, and means for preventing return flow of liquid to said casing when said rotor rotates in the opposite direction.

18. A power transmission comprising rotatable driving and driven elements, driving heads connected to one of said elements for rotation in relatively opposite directions, a rotor connected to the other of said elements of rotation therewith and movable axially between said driving heads, hydraulic torque transmitting means carried by the rotor and including pumps each having a pair of valves provided with operating portions extending respectively to opposite sides of the rotor, and pump operating means cooperative with the respective driving heads by axial movement of the rotor in one or the other direction to cause rotation of the rotor in one or the other direction, each valve of each pair functioning as a pump discharge or inlet valve according to the direction of axial movement of the rotor.

19. A power transmission comprising driving and driven shafts, an axially movable rotor connected to rotate with one of said shafts, hydraulic means carried by the rotor for transmitting torque between said shafts, means controlled by axial movement of the rotor for varying the magnitude of torque transmitted by said hydraulic means while the driving shaft is rotating at or above the speed of the driven shaft and relieving said hydraulic means of torque transmission while the driving shaft is rotating at a speed below that of the driven shaft, and means for mechanically coupling said shafts.

20. A power transmission according to claim 19, wherein said coupling means is rendered operative coincident with axial movement of said rotor.

21. A power transmission comprising driving and driven elements, hydraulic torque transmitting means including a rotor and liquid circulating means carried by the rotor, means for connecting the liquid circulating means and rotor respectively to the driving and driven elements for transmitting torque between said elements, an enclosure carried by the rotor for supplying liquid to the liquid circulating means, a reservoir to contain liquid for said liquid circulating means, and auxiliary liquid supply means operative by the liquid circulating means for transferring liquid from the reservoir to the rotor enclosure.

22. A power transmission as defined in claim 21, wherein said connecting means includes means for rotating the rotor in one or the other direction, and said liquid transferring means comprises a pump operative during rotation of the rotor in said one direction to effect said transferring of liquid, and means operative to prevent return flow of liquid from the rotor enclosure to said reservoir during rotation of the rotor in said other direction.

EDWARD J. THURBER.

REFERENCES CITED

The following references are of record in the file of this patent:

UNITED STATES PATENTS

| Number | Name | Date |
|---|---|---|
| 1,095,479 | Sundh | May 5, 1914 |
| 1,138,415 | Rayburn | May 4, 1915 |
| 1,456,956 | Williams | May 29, 1923 |
| 1,956,893 | Carter | May 1, 1934 |
| 1,990,212 | Toncich | Feb. 5, 1935 |
| 2,079,691 | Joyce | May 11, 1937 |
| 2,081,689 | Tyler | May 25, 1937 |
| 2,241,764 | Bollinger | May 13, 1941 |